June 2, 1936.  W. S. BRUBAKER  2,042,767
LEAKAGE COMPENSATING METER
Filed July 15, 1932  3 Sheets-Sheet 1

Witnesses
H. Woodard

Inventor
Walter S. Brubaker
By
Attorney.

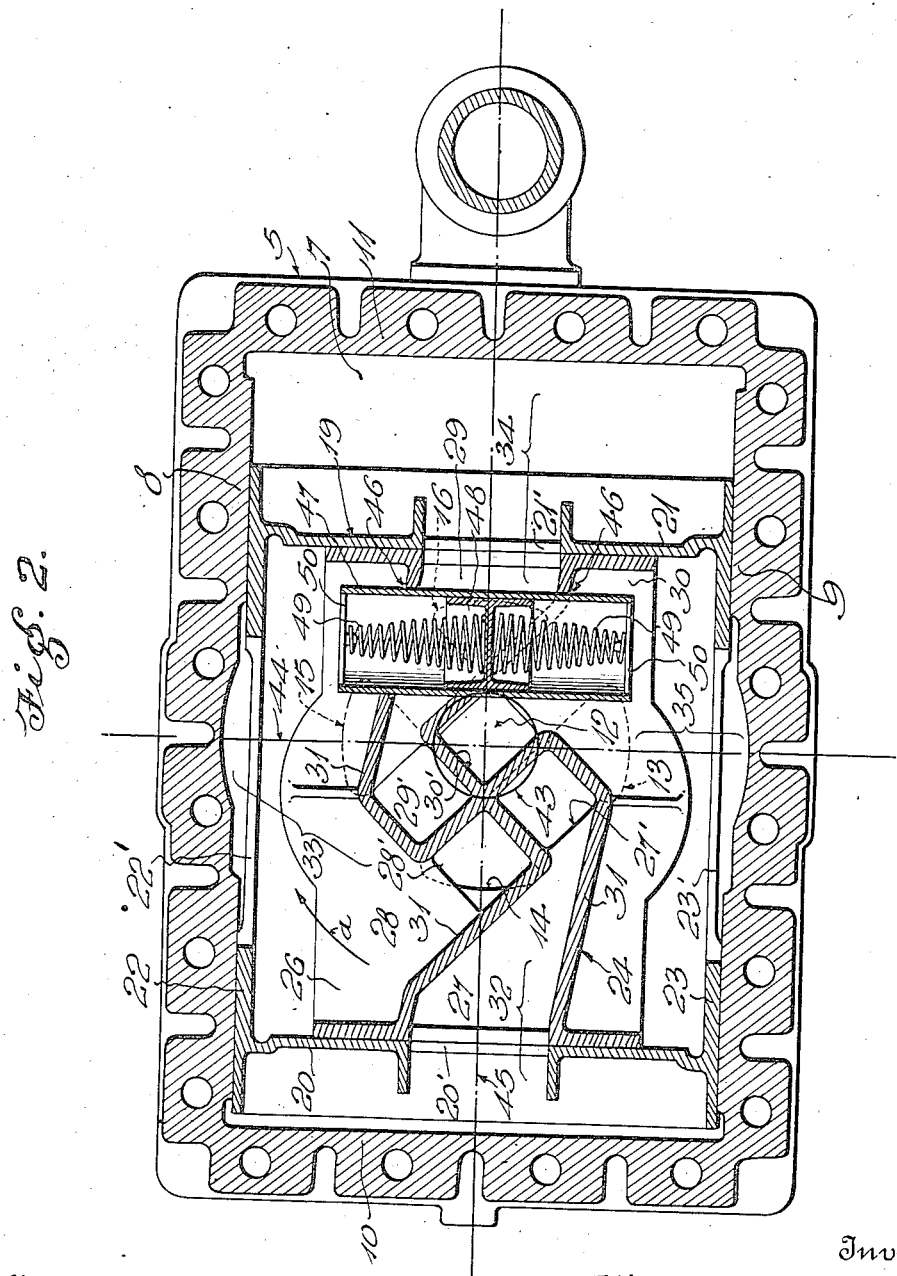

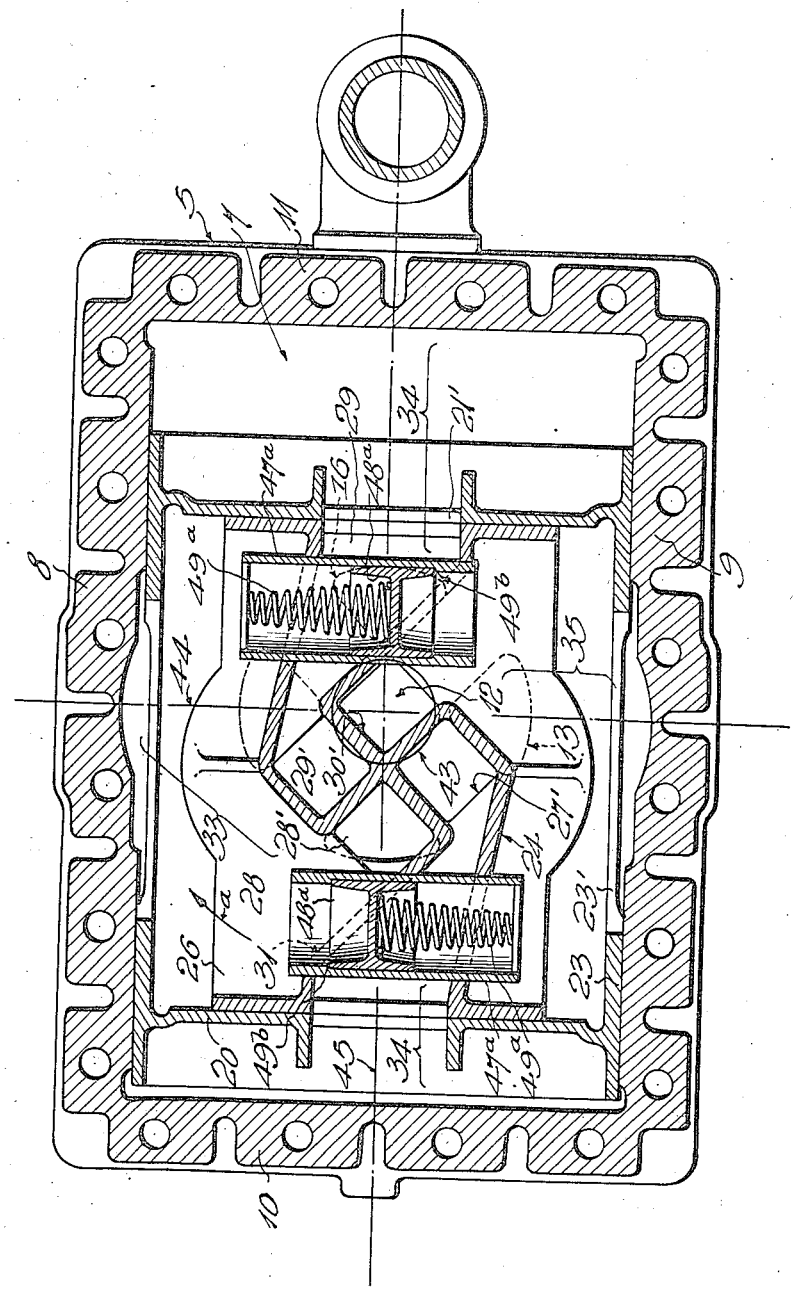

Patented June 2, 1936

2,042,767

UNITED STATES PATENT OFFICE 2,042,767

LEAKAGE COMPENSATING METER

Walter S. Brubaker, San Francisco, Calif., assignor to Granberg Meter Corporation, San Francisco, Calif., a corporation of California Application July 15, 1932, Serial No. 622,770

3 Claims. (Cl. 73—240)

In conventional fluid meters, notably those used for measuring gasoline and other liquids, leakage of unmeasured liquid from the intake sides of the meters to the discharge sides thereof, has been a factor preventing strictly accurate meters. This leakage is fairly constant for any given period of time regardless of meter speed and hence is relatively great (compared with the total meter output) at low meter speeds and relatively small (compared with the total meter output) at high meter speeds. It thus follows that if the meter be adjusted for accurate delivery at low speed, it will intolerably under-deliver at high speed, and if adjusted for fairly accurate delivery at high speed, will severely over-deliver at low speed.

I have devised two practicable ways of overcoming the above difficulties. One way (disclosed by my U. S. Patent No. 1,981,831 of November 20, 1934) consists in carrying back a leakage-compensating quantity of liquid from the discharge side of the meter to the intake side thereof at all meter speeds. The other way consists in providing a meter with variable-capacity measuring chambers, in allowing the leakage to discharge from the meter with the fluid handled by said chambers, and in so providing for automatically varying the capacity of said chambers at different rates of flow and meter speeds, that the quantity of fluid handled by said chambers at any rate of flow and for any period, plus the leakage during said period, will constitute the quantity registered during said period. Thus, the initial agreement between register reading and meter output, established at the factory at any desired flow and meter speed, will be maintained at all flows and meter speeds at which the meter is intended to operate. In accomplishing the desired result, it is necessary:—(1) that the volumetric displacement of the measuring chambers be at minimum when flow and meter speed are at minimum (when leakage is relatively great); (2) that said volumetric displacement of said chambers be at maximum when flow and meter speed are at maximum (when leakage is relatively small); (3) that the volumetric displacement of said chambers increases as meter speed increases; (4) that said volumetric displacement of said chambers decreases as meter speed decreases, and (5) that the register be so adjusted that it will over-register the fluid actually handled by the measuring chambers during any period, as much as the total leakage during said period. Thus, while at various meter speeds, the measuring chambers, jointly, actually under-deliver with respect to the reading of the meter register, the deficiency is in all instances supplied by the quantity which has leaked unmeasured through the meter. To make this more clear, we will assume, first—a conventional meter having an output of ten gallons per minute at a speed of ten revolutions per minute, second—that this meter is operated at said speed of 10 revolutions per minute, and third—that the leakage is 1/10 gallon during each minute of meter operation. This one-tenth gallon leakage in each minute is 1/100 of the ten gallons delivered in said minute. Hence, to produce meter accuracy at this speed, the measuring chambers should handle only 99/100 of the delivered fluid, and the leakage of 1/100 would supply the deficiency. We will now assume the same meter speeded to fifty revolutions per minte with a consequent output of fifty gallons per minute. In each minute, while the fluid delivered would be five times as great as before, or fifty gallons, the leakage per minute would be about the same, that is 1/10 gallon. This 1/10 gallon leakage per minute is only 1/500 of the fifty gallons discharger per minute. Thus, to produce meter accuracy at the speed of fifty revolutions per minute, the measuring chambers should handle 499/500 of the delivered fluid, for the leakage will only supply a deficiency of 1/500. It will therefore be seen that to obtain the desired accuracy, the cubic capacities of the measuring chambers must be varied with meter speed as above explained. The present invention aims primarily to fulfill this requirement by means of a simple and efficient construction.

Another object is to provide a construction in which the means for varying the cubic capacities and therefore the volumetric displacement of the measuring chambers, is carried by a piston member of the meter and is automatically actuated by the pressure difference between an inletting chamber and a discharging chamber. At relatively low meter speeds, this pressure difference is relatively small but it increases with meter speed increase and vice versa. I am therefore enabled to utilize this varying pressure difference to change the effective sizes of the measuring chambers to the various extents required at the numerous meter speeds.

With the foregoing in view, the invention resides in the novel subject matter hereinafter described and claimed, description being accomplished by reference to the accompanying drawings.

Fig. 2 is a horizontal sectional view on line 2—2 of Fig. 1.

Fig. 3 is a horizontal sectional view similar to Fig. 2, but showing a modified construction.

Figure 1:
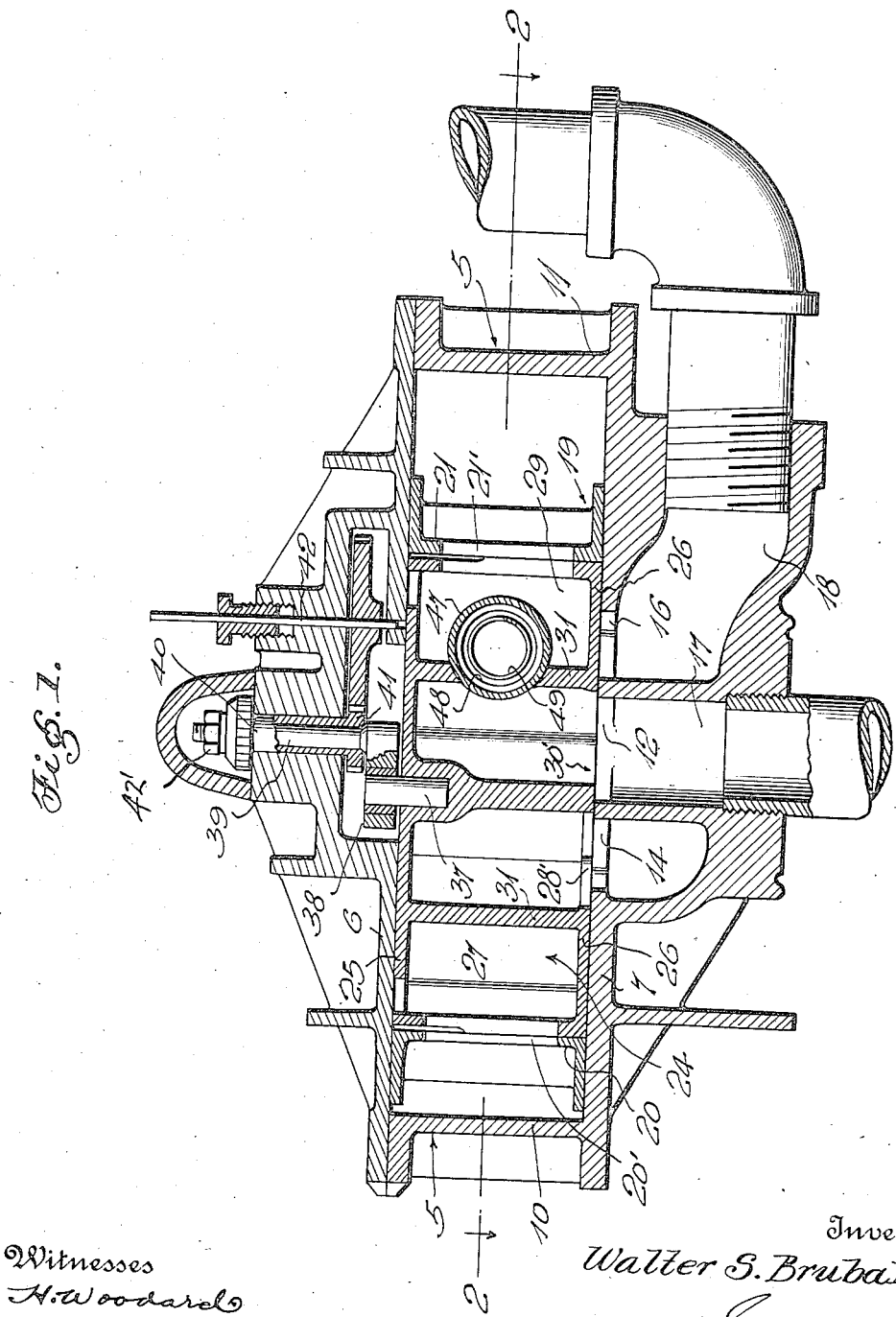
Fig. 1 is a central vertical longitudinal sectional view through a meter constructed in accordance with my invention.

The meter structure shown is of the same general type as that shown in U. S. patents to Granberg, 1,460,715 of July 3, 1923, Reissue 15,476 of October 24, 1922, and 1,479,961 of January 8, 1924, but to accomplish the new result, variations are made which will be fully described. One general description will first be employed, and from this general description, reference to the improvements, will be purposely omitted, but this deficiency will later be satisfied by explaining the variations over the old structure to accomplish the required result.

The meter casing 5 embodies parallel top and bottom side walls 6 and 7, substantially parallel edge walls 8 and 9 and end walls 10 and 11. Formed through the bottom wall 7 are a central admission port 12 and four discharge ports 13, 14, 15, and 16 spaced equidistantly around said admission port 12. The port 12 communicates with a passage 17 for connection with a pipe line or the like leading from an elevated tank or from a pump connected with storage. The ports 13, 14, 15 and 16 all communicate with an exhaust manifold 18 for connection with piping or the like extending to any required delivery point.

Disposed within the casing 5 in sliding contact with the casing walls 6, 7, 8, and 9, is a reciprocatory valve-guiding frame or piston member 19, itself having parallel ends 20 and 21, and parallel sides 22 and 23, said ends and sides having ports 20', 21', 22', and 23', respectively. Within the frame 19 is a gyratory valve or piston member 24 having top and bottom side plates 25 and 26 between which are compartments 27, 28, 29 and 30 separated by webs 31. These compartments are provided with combined admission and discharge ports 27', 28', 29' and 30', respectively, all formed through the valve bottom 26 and said compartments co-act with the edge and end walls 8, 9, 10, and 11 of the casing 5 in forming fluid measuring chambers 32, 33, 34, and 35 which alternately expand and contract as the valve member 24 gyrates. As these chambers 32, 33, 34, and 35 expand, they receive the fluid to be measured from the admission passage 17, said fluid entering through the admission port 12 and the ports 27', 28', 29', and 30', and serving to drive the meter. As the chambers 32, 33, 34, and 35 contract, they expel the fluid through the aforesaid ports 27', 28', 29', and 30', and the discharge ports 13, 14, 15, and 16, respectively, to the manifold 18.

The valve member 24 always travels on a truly circular path, being confined to said path by part of the means which establishes a driving connection between said valve member and the conventional register (not shown). In the present showing (see Fig. 1), a crank pin or stud 37 on member 24 engages a crank 38, said crank 38 being secured to the lower end of a shaft 39. This shaft 39 passes through a rotatably mounted eccentric sleeve 40 which carries the main driving gear 41 for the register shaft 42. Sleeve 40 is normally secured to shaft 39 by any preferred means such as a nut 42'. Loosening of this means 42' allows relative turning of sleeve 40 and shaft 39 to vary the throw of the crank, hence allowing manual changing of the capacities of the chambers 32, 33, 34 and 35 to adjust them with the register reading. The path of the crank pin 37 and hence the path of the center of valve member 24, is shown by the circular line 43 on Fig. 2, the direction of travel being indicated by arrow a. On this same view, I have placed the lines 44 and 45 for ease in explaining the intake and discharge "strokes" of the meter. These lines are at 90° to each other and pass through the axis of rotation of the crank. During the 180° travel of the crank pin 37 "below" the line 45, chamber 32 is contracted from the large extreme of its size to the small extreme thereof, said extremes of sizes and those hereinafter mentioned of course depending upon the relative adjustment of shaft 39 and sleeve 40. Similarly, during said 180° crank travel "below" line 45, chamber 34 becomes expanded from the small extreme of its size to the large extreme thereof. The reverse with regard to the chambers 32 and 34 takes place during the 180° travel of crank pin 37 "above" the line 45. During the 180° travel of the crank pin 37 at the left of the line 44, chamber 33 is contracted from its large to its small size extreme, and chamber 35 is expanded from small to large extreme, and during the 180° travel of said crank pin at the right of said line 44, the reverse takes place with respect to said chambers 33 and 35. As the chambers expand, they receive the driving fluid from the passage 17, and as they contract, they expel the fluid through the manifold 18, the admission and discharge of the fluid being controlled by the above described ports and the valve member 24 which controls registration thereof.

During the functioning of the meter as above explained, the previously mentioned leakage necessarily takes place, but I have provided for so varying the cubic capacities of two of the chambers (33 and 35) as to cause the four chambers to jointly under-deliver (with respect to the register reading) in any given period and at any meter speed, a quantity which will be replaced by the leakage during said period. In accomplishing this in the construction shown in Figs. 1 and 2, I form alined openings 46 in two of the webs 31, and secure a cylinder or conduit 47 (hereinafter termed a cylinder) in said openings, the ends of said cylinder constituting auxiliary chambers and being in communication with the chambers 33 and 35 respectively with which they co-act in producing two of the four measuring chambers of the meter. In the cylinder 47, I place a pressure-moved piston or partition 48 (hereinafter termed a piston) so that the opposite sides of said piston form movable wall portions for said two measuring chambers. Means are provided, acting in opposite directions upon the piston 48, for resisting the movements of said piston, said means preferably consisting of springs 49 having their outer ends secured to bars 50 which span the ends of the cylinder 47.

It will be recalled that while chamber 35 is expanding and receiving fluid, chamber 33 is contracting and discharging fluid, and vice-versa. Consequently, there is usually a difference in pressure in these two chambers, and I utilize this pressure difference to move the spring-resisted piston 48 so as to automatically adjust the chamber 35 to proper cubic capacity while it is expanding and inletting, and to automatically adjust the chamber 33 to proper cubic capacity while this chamber is expanding and inletting. The pressure difference between the chambers 35 and 33 varies with meter speed, being small at slow speed and relatively large at high speed. Hence, at minimum speed (with the leakage relatively great compared with the total output) the piston 48 is moved only a trifle if at all. The chambers 33 and 35 are therefore at minimum cubic capacity but the quantity jointly delivered by all of the measuring chambers 32, 33, 34, and 35, plus the quantity leaking unmeasured, insure delivery of the proper quantity to agree with the register reading. As meter speed increases, the pressure difference between chambers 33 and 35 increases and consequently the piston 48 will be further moved by said pressure difference, thereby increasing the cubic capacity of chamber 33 each time it inlets, and similarly increasing the cubic capacity of chamber 35 each time this chamber inlets. Thus at the more rapid meter speed (when the leakage is relatively small compared with the total output) the measuring chambers jointly discharge more fluid per cycle and this fluid added to the leakage, again insures delivery of the proper quantity for agreement with the register reading. At maximum meter speed (with the leakage only trivial with respect to the total output) the measuring chambers 33 and 35 when inletting, are enlarged to the maximum by means of the pressure-effected piston movement so that the fluid jointly handled by the various measuring chambers, plus the leakage, equal the required quantity.

When the meter moves so that the chamber 35 at one end of the cylinder 47 is admitting liquid, the diametrically opposite chamber 33 is discharging liquid, therefore, the pressure in the first chamber (35) is greater than the pressure in the second (33) and the piston 48 will move toward the latter (33) and the cylinder 47 will partially fill with liquid from the first chamber (35). When the moving parts of the meter have completed a half cycle, the first chamber (35) will begin to discharge and the second chamber (33) to receive liquid. Hence, the pressures in these chambers will be reversed and the piston 48 will be moved toward the end of the cylinder 47 communicating with the first chamber (35) and thereby discharge the volume of liquid which had been drawn into the cylinder. This operation will take place once for every revolution of the meter. The movement of the piston 47 is resisted by the springs 49, and hence these springs are instrumental, in limiting the piston movement under the above mentioned pressure difference between inletting and outletting chambers. It can readily be seen that with the small pressure difference which must exist between diametrically opposite chambers at very low rates of flow and with proper opposition from the springs 49, there will be practically no movement of the piston 47; whereas at high rates of flow with their greater pressure differences, there will be correspondingly greater movements of the piston 47. Hence, the added quantity of liquid handled by the chambers 33 and 35 (due to the cylinder and piston) increases with meter speed increase, and decreases with meter speed reduction, and compensates for leakage, so that accurate agreement between meter output and register reading may be attained. Of course, when initially putting the meter into service, it is necessary to adjust the eccentric sleeve 40 to obtain the correct throw of crank 38 for initially rectifying the meter output with register reading. After such initial adjustment however, further adjustments are seldom required.

Instead of using the eccentric sleeve 40 for meter adjustment, the means shown in my U. S. Patent No. 1,949,006 of February 27, 1934 could be used if desired.

In the form of construction shown in Fig. 3, two cylinders 47ª each containing a piston 48ª resisted by a spring 49ª, are employed, and stops 49ᵇ are provided for said pistons. One of the cylinders 47ª and the piston and spring therein, function to vary the cubic capacity and volumetric displacement of the chamber 33, and the other of said cylinders co-acts with the piston and spring therein, in varying the cubic capacity and volumetric displacement of chamber 35. The pistons are moved by the pressure difference between inletting and outletting chambers and the result is the same as above explained.

I claim:—

1. A meter comprising a casing having parallel side walls, parallel edge walls, and end walls, one of said side walls having an admission port and a plurality of discharge ports spaced around said admission port, fluid-discharge means communicating with said discharge ports, a reciprocatory valve-guiding frame within said casing slidably engaging said parallel side and edge walls and itself having parallel end walls spaced inwardly from said casing end walls, a gyratory register-driving valve member within said valve-guiding frame slidably engaging said end walls thereof and said side walls of said casing, said casing, frame and valve member having co-acting portions forming expansible and contractible chambers, portions of the latter being formed by said casing side walls, each of said chambers being adapted to communicate with said admission port during chamber expansion and with a discharge port during chamber contraction; a cylinder passing through said gyratory valve member and having its ends in communication with two of said chambers, a pressure-moved partition in said cylinder for effecting added expansion of one of said two chambers when inletting and added contraction of the other of said two chambers when outletting, and means for resisting the pressure-effected movements of said partition.

2. In a meter of the displacement type through which leakage occurs, said meter having a piston member and means co-acting therewith in forming two chambers, one of which expands and admits fluid while the other is contracting and discharging fluid, and vice versa, as the piston member moves, and valve-controlled admission and discharge means for said chambers; compensating means for leakage comprising a cylinder passing through said piston member, said cylinder having its ends in communication with the aforesaid chambers to co-act therewith in forming measuring chambers, a partition in said cylinder for varying the displacement of said measuring chambers, the meter being constructed to effect movement of said partition to produce added expansion of the inletting measuring chamber and added contraction of the outletting measuring chamber as flow and meter speed increase, and vice-versa, the differences in fluid displacement of the measuring chambers being proportioned to counteract leakage through the meter, and means for resisting the pressure effected movements of said partition.

3. In a meter of the displacement type through which leakage occurs, said meter having two measuring chambers, a piston member forming in part said two measuring chambers, one of said chambers being an expanding inletting chamber while the other is a contracting outletting chamber and vice-versa during meter operation; shiftable means carried by said piston member and exposed to both of said chambers, said shiftable means being shiftable by the pressure difference between inletting and outletting chambers to produce added expansion of the former and added contraction of the latter as flow and meter speed increase and vice-versa, the differences in fluid displacement of the chambers serving to compensate for leakage, and yieldable means for resisting the movements of said shiftable means.

WALTER S. BRUBAKER.